(No Model.)

P. G. STORMER.
BICYCLE TIRE.

No. 576,171. Patented Feb. 2, 1897.

Witnesses
E. G. McKee
K. A. Nau

Inventor,
Peter G. Stormer,
by John Wedderburn
Attorney

UNITED STATES PATENT OFFICE.

PETER G. STORMER, OF JOHNSTOWN, PENNSYLVANIA.

BICYCLE-TIRE.

SPECIFICATION forming part of Letters Patent No. 576,171, dated February 2, 1897.

Application filed June 6, 1896. Serial No. 594,585. (No model.)

*To all whom it may concern:*

Be it known that I, PETER G. STORMER, a citizen of the United States, residing at Johnstown, in the county of Cambria and State of Pennsylvania, have invented certain new and useful Improvements in Bicycle-Tires; and I do hereby declare the following to be a full, clear, and exact description of the invention, such as will enable others skilled in the art to which it appertains to make and use the same.

My invention relates to improvements in bicycle-tires, the object of the same being to produce a tire for bicycles, buggies, invalid-chairs, and the like which shall furnish a resilient bearing for the wheels of said vehicles without the use of compressed air.

The invention consists of a tire of rubber or other suitable material, having a tubular strip of canvas on the inside thereof, which incloses a spring of peculiar construction adapted to hold said rubber tire in its outer or expanded position, so that the same will not be affected by punctures requiring immediate repairs, and which will at the same time be as effective in taking jars from the rider of the vehicle as the well-known pneumatic tire.

The invention is clearly illustrated in the accompanying drawings, in which—

Figure 1:
Figure 2:
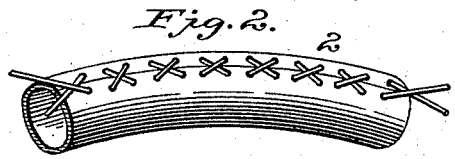
Figure 3:
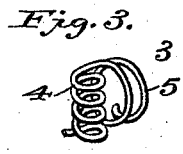

Figure 1 represents a sectional view through a tire constructed according to my invention. Fig. 2 is a similar view of the inner tubing of canvas or like material, showing the means for securing the spring on the interior thereof. Fig. 3 is a perspective view of a section of spring used by me.

Like reference-numerals indicate like parts in the different views.

The tire 1 is made of rubber or other suitable elastic material, is hollow, and is adapted to be secured to the rim of the wheel in the usual way. On the inside of the tire 1 is a tubular strip of canvas 2 with a spring 3 on the inside thereof. The spring 3 is of peculiar construction, consisting of a series of coils 4, extending longitudinally of the radii of the wheels, and a second series of coils 5 at right angles thereto. By this construction the weight of the vehicle and the occupants or riders thereof is taken up by the coils 4, and the tire 1 is kept in its circular form by the coils 5.

In making my tire I proceed as follows: The spring 3 is first secured to the inside of the strip of canvas 2 by lacing the latter along its two outer edges, the lacings being drawn so as to contract the springs on the inside of the canvas tubing 2. A string is then attached to one end of the tubing 2 and a marble or other weight connected to the outer end of said string, which is inserted through an opening on the inner side of the tire 1 and passed entirely around through said tire. By drawing on this string or cord the tube 2 containing the spring 3, being of smaller diameter than the tire 1, can be readily and conveniently drawn into said tire. The outer ends of the strip of canvas are then sewed together and the ends of the spring 3 are connected by twisting the same and the laces in the canvas strip removed, allowing the springs 3 to expand and entirely fill up the inside of the tire 1.

From the foregoing description, taken in connection with the accompanying drawings, it will be seen that I have devised a simple and cheap tire which will take the place of the ordinary pneumatic tire now in use, which will be equally effective in relieving the vehicle from shocks, and which will have the further advantage that it is not affected by puncture and does not need to be constantly filled with compressed air.

Having now described my invention, what I claim as new, and desire to secure by Letters Patent, is—

In a bicycle-tire, the combination with an outer tubing of rubber or other suitable material, of an inner tube of canvas or other suitable material and a spring inclosed by said inner tube, the same being made up of a series of coils running longitudinally of the radii of the wheel to which the tire is attached and a second series of coils at right angles thereto, substantially as and for the purpose described.

In testimony whereof I have signed this specification in the presence of two subscribing witnesses.

PETER G. STORMER.

Witnesses:
CHAS. LEFFLER,
A. G. RIPPLE.